US010714081B1

(12) United States Patent
Miller et al.

(10) Patent No.: US 10,714,081 B1
(45) Date of Patent: Jul. 14, 2020

(54) DYNAMIC VOICE ASSISTANT INTERACTION

(71) Applicant: Amazon Technologies, Inc., Seattle, WA (US)

(72) Inventors: John Martin Miller, Seattle, WA (US); Michael Lee Loritsch, Seattle, WA (US); Ross Tucker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 15/062,760

(22) Filed: Mar. 7, 2016

(51) Int. Cl.
| *G10L 15/22* | (2006.01) |
| *G10L 15/08* | (2006.01) |
| *G10L 13/00* | (2006.01) |
| *G06Q 30/02* | (2012.01) |

(52) U.S. Cl.
CPC .......... *G10L 15/22* (2013.01); *G06Q 30/0275* (2013.01); *G10L 13/00* (2013.01); *G10L 15/08* (2013.01); *G10L 2015/088* (2013.01); *G10L 2015/223* (2013.01)

(58) Field of Classification Search
CPC ... G10L 15/22; G10L 15/26; G10L 2015/228; G10L 13/00; G10L 15/30; G10L 21/0208; G10L 15/00; G10L 15/063; G10L 15/20; G10L 15/265; G10L 17/22; G10L 2015/088; G10L 2015/227; G10L 15/08; G10L 2015/223; G06F 3/167; G06F 17/27; G06F 17/289; H04M 3/4878; H04M 3/42059; H04M 3/42161; H04M 3/493; H04M 3/4938; H04M 3/5166; H04M 2201/39; H04M 2201/40; H04M 2203/105; H04M 2203/355; H04M 2203/50; G06Q 30/0275
See application file for complete search history.

(56) References Cited

U.S. PATENT DOCUMENTS

| 5,812,201 | A * | 9/1998 | Yoo | G11B 27/10 |
| | | | | 348/423.1 |
| 5,839,958 | A * | 11/1998 | Ozarow | A63F 1/18 |
| | | | | 463/35 |
| 8,131,594 | B1 * | 3/2012 | Yehoshua | G06Q 30/0255 |
| | | | | 705/14.53 |
| 8,548,849 | B1 * | 10/2013 | Porter | G06Q 30/00 |
| | | | | 705/14.13 |
| 8,910,201 | B1 * | 12/2014 | Zamiska | H04N 21/44222 |
| | | | | 725/34 |
| 8,938,497 | B1 | 1/2015 | Wang | |
| 9,064,282 | B1 * | 6/2015 | Carpenter | G06Q 30/08 |
| 9,087,520 | B1 | 7/2015 | Salvador | |
| 9,330,401 | B2 * | 5/2016 | Terrell, II | G06Q 30/02 |
| 9,405,918 | B2 * | 8/2016 | Freed | G06F 3/013 |
| 9,418,658 | B1 | 8/2016 | David | |

(Continued)

*Primary Examiner* — Abdelali Serrou
(74) *Attorney, Agent, or Firm* — Eversheds Sutherland (US) LLP

(57) ABSTRACT

Systems, methods, and computer-readable media are disclosed for dynamic voice assistant interaction. Example methods may include receiving first voice data, determining a first meaning of the first voice data, conducting an auction for an audio segment to present in response to the first voice data, wherein the auction is based at least in part on the first meaning, and determining a first audio response for presentation via a speaker in response to the first voice data.

18 Claims, 5 Drawing Sheets

(56) References Cited

U.S. PATENT DOCUMENTS

| | | | |
|---|---|---|---|
| 9,473,819 B1 | 10/2016 | Bostick | |
| 2002/0026391 A1* | 2/2002 | Laster | G06Q 10/087 |
| | | | 705/28 |
| 2002/0095330 A1* | 7/2002 | Berkowitz | G06Q 30/02 |
| | | | 705/14.46 |
| 2003/0220835 A1* | 11/2003 | Barnes, Jr. | H04M 1/72519 |
| | | | 705/14.36 |
| 2007/0121846 A1* | 5/2007 | Altberg | H04M 15/00 |
| | | | 379/114.13 |
| 2007/0174258 A1* | 7/2007 | Jones | G06Q 30/02 |
| 2007/0174772 A1* | 7/2007 | Gorman | G10L 13/00 |
| | | | 715/716 |
| 2009/0245479 A1* | 10/2009 | Surendran | H04M 3/4878 |
| | | | 379/70 |
| 2010/0095332 A1 | 4/2010 | Gran | |
| 2010/0185687 A1* | 7/2010 | Chung | G06Q 30/02 |
| | | | 707/803 |
| 2010/0241498 A1* | 9/2010 | Chung | G06Q 30/02 |
| | | | 705/14.5 |
| 2011/0271194 A1* | 11/2011 | Lin | G10L 15/22 |
| | | | 715/728 |
| 2013/0117105 A1* | 5/2013 | Dyor | G06Q 30/0251 |
| | | | 705/14.52 |
| 2013/0117130 A1* | 5/2013 | Dyor | G06Q 30/0273 |
| | | | 705/14.71 |
| 2014/0136336 A1* | 5/2014 | Mak | G06Q 30/0275 |
| | | | 705/14.71 |
| 2015/0019348 A1* | 1/2015 | Young-Lai | H04L 67/18 |
| | | | 705/14.71 |
| 2015/0039316 A1* | 2/2015 | Tzirkel-Hancock | G06F 3/167 |
| | | | 704/275 |
| 2015/0042570 A1* | 2/2015 | Lombardi | G06F 1/3206 |
| | | | 345/173 |
| 2015/0162006 A1 | 6/2015 | Kummer | |
| 2015/0382047 A1 | 12/2015 | Van Os | |
| 2016/0092932 A1* | 3/2016 | Bharath | G06Q 30/0271 |
| | | | 705/14.67 |
| 2016/0335677 A1* | 11/2016 | Aleksic | G06Q 30/0256 |
| 2017/0091828 A1* | 3/2017 | Siegler | G06Q 30/0275 |
| 2019/0026787 A1* | 1/2019 | Aleksic | G10L 15/06 |

* cited by examiner

DYNAMIC VOICE ASSISTANT INTERACTION

BACKGROUND

Users may consume audio content via a number of content consumption devices. Certain content consumption devices may be configured to receive voice-based commands, or may otherwise be configured to recognize speech. Such devices, however, may lack an ability to determine an intent or a meaning of certain speech. As a result, voice interaction with certain content consumption devices may be limited. For example, certain devices may include voice assistants that reply to user speech. However, such replies may be irrelevant to a meaning of the speech.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
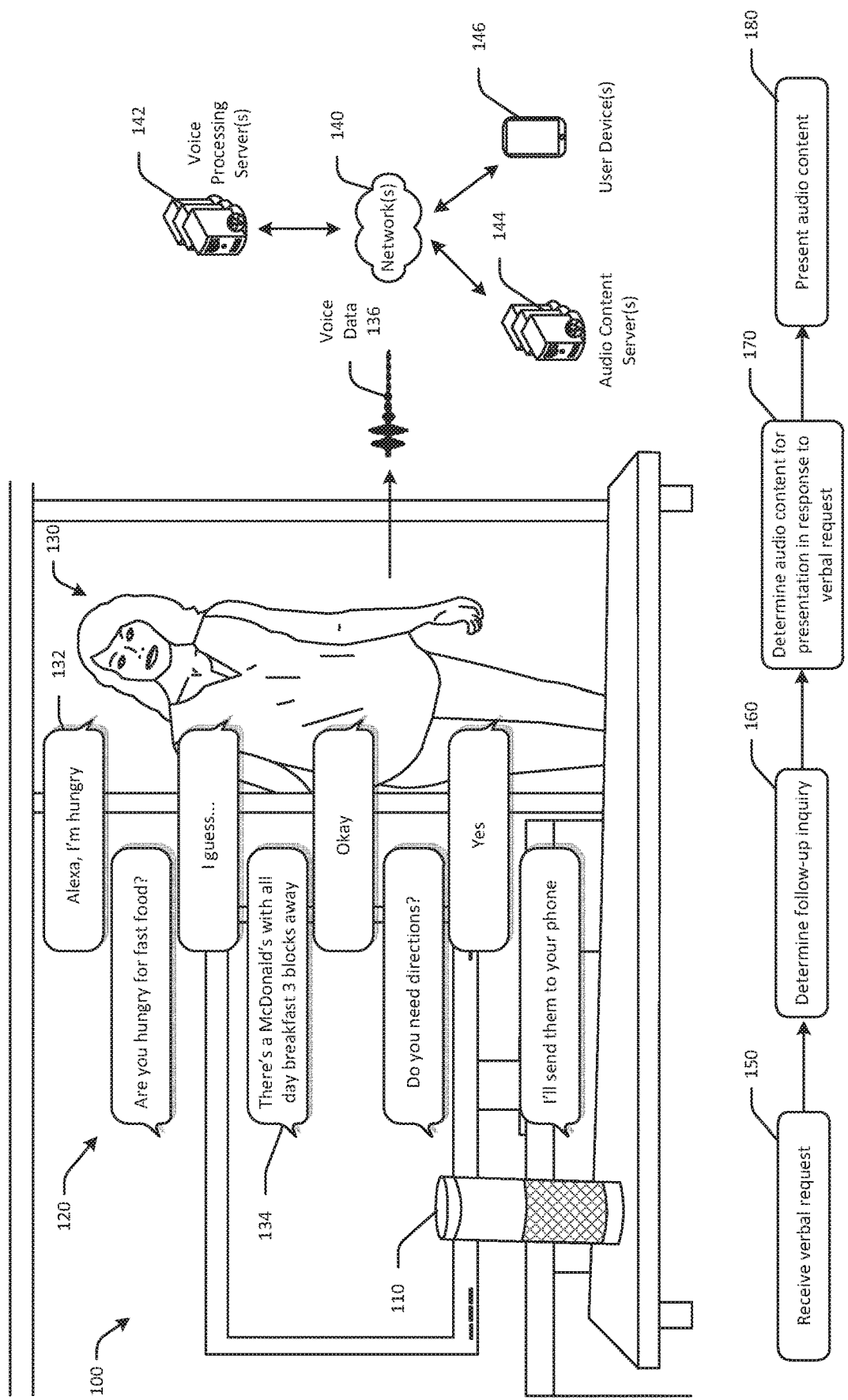
FIG. 1 is a schematic diagram of an example use case illustrating dynamic voice assistant interaction in accordance with one or more example embodiments of the disclosure.

This disclosure relates to, among other things, devices, systems, methods, computer-readable media, techniques, and methodologies for dynamic voice assistant interaction. Certain embodiments may include voice assistants that process voice or speech and determine a meaning of the voice or speech, and may engage in conversations with users. Upon determining a meaning of the speech, embodiments of the disclosure may generate audible responses to the speech, so as to interact with one or more users. By determining a meaning or an intent of speech, and by generating relevant audible responses, embodiments of the disclosure may actively interact with users, thereby resulting in increased functionality, for example, with respect to user requests made via speech. For example, a user may utter the phrase "I am bored." Embodiments of the disclosure may determine that the user is bored, and may generate an audible response, or query, of, for example, "are you in the mood for a movie?" The user may reply to the audible response to continue a conversation. For example, if the user replies in the affirmative, embodiments of the disclosure may generate an audible response of "would you like to see an action movie again?" In generating audible responses throughout a conversation, embodiments of the disclosure may access a user profile that may include information such as purchase history, geolocation information, preferences, wish lists, purchase trends, and other contextual data. In this example, a user may have previously watched an action movie. If the user again replies in the affirmative, embodiments of the disclosure may present a list of one or more action movies playing at nearby theatres, for example, or action movies that are available for streaming. If the user is not interested in action movies, alternate genres may be suggested. If the user is not interested in movies, alternate activities may be suggested, such as concerts, museums, restaurants, and other social activities. Conversations may continue and may include providing audible reviews of activities or places (e.g., Yelp® reviews, etc.), sending directions to a mobile device, making reservations, or other actions. In some embodiments, audio advertisements may be presented during a conversation with a user. For example, if a user is engaged in a conversation regarding food options for dinner, audio promotions or advertisements associated with one or more local restaurants may be presented during a conversation with the user. For example, embodiments of the disclosure may present an audible response of "Miller's Pizza has a 50% off coupon available right now that you can use."

Embodiments of the disclosure may facilitate dynamic voice assistant interaction, such that voice assistants may engage in conversation with users. Embodiments of the disclosure may include voice processing or speech recognition systems. Such systems may employ techniques to identify words spoken by a human user based on the various qualities of a received audio input. Speech recognition may be combined with natural language understanding processing techniques to enable speech-based user interaction with a computing device to perform tasks based on the user's spoken commands, or to engage in a conversation with a user. Speech processing may also convert a user's speech into text data which may then be provided to various text-based software applications.

Referring to FIG. 1, an example use case for dynamic voice assistant interaction is illustrated in accordance with one or more embodiments of the disclosure. An environment 100 may include a voice interaction device 110 that a user 130 can interact with. The voice interaction device 110 may communicate with one or more voice processing servers 142, one or more audio content servers 144, and/or one or more user devices 146 via one or more communication networks 140. The voice interaction device 110 may determine a meaning of utterances spoken by the user 130, and may generate audible content 120, such as comments, inquiries, and other responses, in response to user utterances. Audible content 120 may be targeted or sponsored content, and in some embodiments, may be third-party content. The user 130 may interact with the voice interaction device 110, for example via a voice assistant or other audible or sound-based interaction technique. In some embodiments, the user 130 may interact with the voice interaction device 110 by providing analog sound input (e.g., voice) to the voice interaction device 110. The voice interaction device 110 may receive or detect the analog sound input and may generate digital voice data 136 representative of the analog sound input. The voice interaction device 110 may send the voice data 136 to the one or more voice processing server(s) 142 over the one or more wired or wireless communication networks 140 to determine a meaning of the sound input, or voice data 136. In some embodiments, the voice interaction device 110 may perform voice processing on the voice data 136 locally. While FIG. 1 illustrates an embodiment where audible content 120 is presented during user interaction with a voice assistant, in other embodiments, audible content may be presented during third party content presentation, such as during a streaming music playlist or other third party content.

The voice interaction device 110 may be configured to generate the audible content 120 and may be, for example, a device such as a television, a laptop computer, a tablet, a computer monitor, a speaker-type device, augmented reality or virtual reality glasses or devices, or another device configured to output audio. The voice interaction device 110 may include or may utilize a speech interface device or other audio device, such as one or more speakers, that are capable of playing or presenting various types of audio. The voice interaction device 110 may include one or more microphones to detect ambient sound. The voice interaction device 110 may be located within the environment 100, such as a home to provide services for the user 130. The voice interaction device 110 may operate in conjunction with and/or under the control of a remote network-based speech command service (e.g., voice processing server(s) 142, audio content server(s) 144, etc.) that is configured to receive audio, to recognize speech in the audio, and to perform functions or services in response to the recognized speech, or to generate audible dialog or audible content in response to recognized speech. The voice interaction device 110 may have one or more microphones and one or more audio speakers or transducers to facilitate speech interactions with the user 130. The voice interaction device 110 may have a network communications interface for communicating over one or more communications networks 140. The voice interaction device 110 may receive spoken expressions or utterances from the user 130 and may provide services, perform actions, or facilitate conversation or dialogue in response to the spoken utterances. For example, the user may speak an utterance with a verbal request. In some embodiments, the voice interaction device 110 may only be activated to listen upon determining that the user 130 has spoken a predefined wake or trigger expression (e.g., "Awake" or "Alexa," etc.), which may be followed by an utterance (e.g., "I'd like to go to a movie."). Provided services may include performing actions or activities, rendering media, obtaining and/or providing information, providing information via generated or synthesized speech via the voice interaction device 110, initiating Internet-based services on behalf of the user 130, performing actions relating to home automation and control, and so forth.

In the example of FIG. 1, the user 130 may initiate a conversation 132 with the voice interaction device 110 by speaking "Alexa, I'm hungry." In this embodiment, "Alexa" may be a wakeword, and the voice interaction device 110 may detect or determine that a wakeword was spoken. In some embodiments, the voice interaction device 110 may not need to be triggered or engaged with a wakeword.

FIG. 1 depicts an example process flow in accordance with one or more embodiments of the disclosure. At block 150, the voice interaction device 110 may receive a verbal request. For example, the voice interaction device 110 may receive the utterance "Alexa, I'm hungry" spoken by the user 130. The voice interaction device 110 may receive the verbal request via an audio capture component, such as a microphone.

At block 160 of the process flow, the voice interaction device 110 may determine a follow-up inquiry. For example, the voice interaction device 110 may communicate with the voice processing server(s) 142 to determine a meaning of the utterance "Alexa, I'm hungry," and may determine, either locally or via the voice processing server(s) 142 and/or the audio content server(s) 144, a follow-up inquiry. Follow-up inquiries may be audible responses to utterances that are constructed or otherwise designed to engage the user 130 in a conversation. By engaging the user 130 in a conversation, a user intent may be determined with increased specificity. Increased specificity of user intent may facilitate the ability to provide highly targeted audio content, such as audio advertisements or promotions, to the user 130. Follow-up inquiries may include questions designed to identify user preferences at any particular moment in time, determine timely user interests, or to further engage a user to determine what suggestions they would like.

In FIG. 1, the voice interaction device 110 may determine a follow-up inquiry of "are you hungry for fast food?" in response to the user's utterance regarding hunger. Follow-up inquiries may be determined by identifying a keyword or category associated with a particular user utterance. For example, the word "hungry" may trigger a follow-up inquiry associated with "food," "restaurants," or "recipes." Follow-up inquiries may be associated with particular advertisers in some embodiments. In the example of FIG. 1, McDonald's may be interested in presenting an audio advertisement to the user 130. As a result, the follow-up inquiry of "are you hungry for fast food?" may be directed towards determining whether the user 130 is a target consumer for receiving a McDonald's audio advertisement. In some embodiments, follow-up inquiries may be provided by advertisers, while in other embodiments follow-up inquiries may be provided by other entities.

At block 170 of the process flow, the voice interaction device 110 may determine audio content for presentation in response to the verbal request. In the example of FIG. 1, the voice interaction device 110 may present audio content associated with the follow-up inquiry of "are you hungry for fast food?" via one or more speakers associated with the voice interaction device 110. The audio content may be a text-to-audio transcription of the follow-up inquiry, or other audio content, such as a jingle associated with an advertiser, a news clip, or other audio content. At block 180, the voice interaction device 110 may present the audio content.

In some embodiments, the process flow may be repeated until an audio advertisement is delivered, or until it is determined that the user 130 is not interested in anything associated with a candidate advertisement. For example, the user 130 may reply to the follow-up inquiry of "are you hungry for fast food?" with "I guess." The voice interaction device 110 may receive the user's reply and determine that the user 130 replied in the affirmative. In response, the voice interaction device 110 may determine one or more candidate fast food audio advertisements or candidate fast food advertisers.

The voice interaction device 110 may facilitate an auction for an available audio advertisement slot for presentation to the user 130. The auction may include sending bid requests to one or more advertisers and determining a winning bid. In some embodiments, a relevance threshold may be established to ensure that the winning bid is associated with an audio advertisement or advertiser that is relevant to the conversation the voice interaction device 110 is having with the user 130. The relevance threshold may be alphanumeric or may be category-based. For example, a fine dining restaurant advertiser may be excluded from presenting an audio advertisement to a user that is interested in fast food. In another example, if the user 130 has indicated that they do not like a certain fast food establishment, that fast food establishment may be prevented from presenting audio advertisements to the user 130.

In the example of FIG. 1, McDonald's may be a candidate advertiser, and may submit the winning bid to be advertised to the user 130. In some embodiments, the auction may be conducted at a different stage in the conversation (e.g., before asking if the user wants fast food, or later in the conversation), or more than one auction may be conducted. For example, a first auction may be conducted when the user indicates that she is hungry, and the candidate advertisers may include multiple types of food options, such as fine dining, carryout, fast food, etc. If McDonald's wins the first auction, McDonald's may provide the follow-up inquiry of "are you hungry for fast food?" to determine whether the user 130 is interested in McDonald's. In other embodiments, the first auction may be conducted after the voice interaction device 110 determines that the user 130 is interested in fast food, so as to increase the specificity with which the user's intent is determined. As the user intent is determined with increased specificity, a floor price for the audio ad slot may be increased because of the highly targeted and timely nature of the ad with respect to the user's immediate interest and desires. For example, a floor price for an audio ad slot at the beginning of a conversation may be $1, while a subsequent audio ad slot during the same conversation may have a floor price of $1.25, or some amount determined thereof (e.g., percentage increase, flat fee increase, etc.). User interest levels and/or historical intent data may be stored as part of a user profile associated with the user.

In certain embodiments, an earcon or other notification tone or sound may be presented prior to and/or after sponsored content or audio advertisements are presented, so as to alert or notify users that the presented content is sponsored content and/or an audio advertisement. In other embodiments, sponsored content or audio advertisements may be presented in different voices than a default voice assistant voice, or in another manner to distinguish the sponsored content from voice assistant based content. Certain embodiments may designate audio content as an advertisement, for example by playing or presenting a tone or other sound before and/or after the advertisement, presenting the advertisement in a particular voice or a voice distinguished from a default voice assistance voice, or another form of designation.

In other embodiments, winning advertisers may provide content for presentation to the user 130 as an audio advertisement. The content may be provided in text form and converted to audio by the voice interaction device 110. For example, McDonald's may provide an audio file of the McDonald's slogan, a promotion, or another audio advertisement.

Continuing the example of FIG. 1, an auction may be conducted upon determining that the user 130 is interested in fast food. McDonald's may be the winning bidder, and may provide an audio advertisement 134 related to all day breakfast now being served at a local McDonald's. The voice interaction device 110 may present the audio advertisement 134 as "there's a McDonald's with all day breakfast 3 blocks away."

The voice interaction device 110 may monitor for an affirmative or negative response from the user 130. If it is determined that the user 130 is not interested in the advertised option or the advertiser, the voice interaction device 110 may determine another option, suggestion, or promotion for the user 130. If it is determined that the user 130 is interested in the advertised option or the advertiser, or McDonald's in the example of FIG. 1, the voice interaction device 110 may proceed to inquire about action items. For example, the voice interaction device 110 may request whether the user 130 would like directions to the McDonald's by generating audio content asking "do you need directions?" The voice interaction device 110 may monitor for a response to the action item request. If it is determined that the user 130 does not initiate action items, the process flow may be complete and the data flow may end. If it is determined that the user 130 initiates an action item, the voice interaction device 110 may implement the requested action items. For example, if the user 130 replies "yes," the voice interaction device 110 may reply with "I'll send them to your phone," and may initiate sending directions to the McDonald's to the user device 146. The process flow may then end. Action items may be selected from a number of available action items, such as directions, making calls or reservations, presenting content or images, or other action items.

The systems, methods, computer-readable media, techniques, and methodologies for dynamic voice assistant interaction may facilitate conversations with users leading to an increased ability to determine a user intent. The user intent may be used to determine audio content that is relevant to the user, such as audio advertisements or other audio content, that can be presented to the user, where the audio content is highly relevant and timely to the user's current desires and situation.

Example embodiments of the disclosure provide a number of technical features or technical effects. For example, in accordance with example embodiments of the disclosure, certain embodiments of the disclosure may provide audio channels for targeted audio content, such as audio advertising. Due to the serial workflow of audio content, in that singular audio content may be presented at the same time (e.g., two songs cannot be played at once, etc.), presentation of audio content is distinguished from visual or graphic content. As a result, interaction with audio content, such as audio advertisements, is also distinguished from visual content. Embodiments of the disclosure may generate audio content, such as audio advertisements, based at least in part on interactions with a voice assistant. Embodiments of the disclosure may inject interactive audio advertisements on demand into other audio content (e.g., a music playlist, etc.). The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
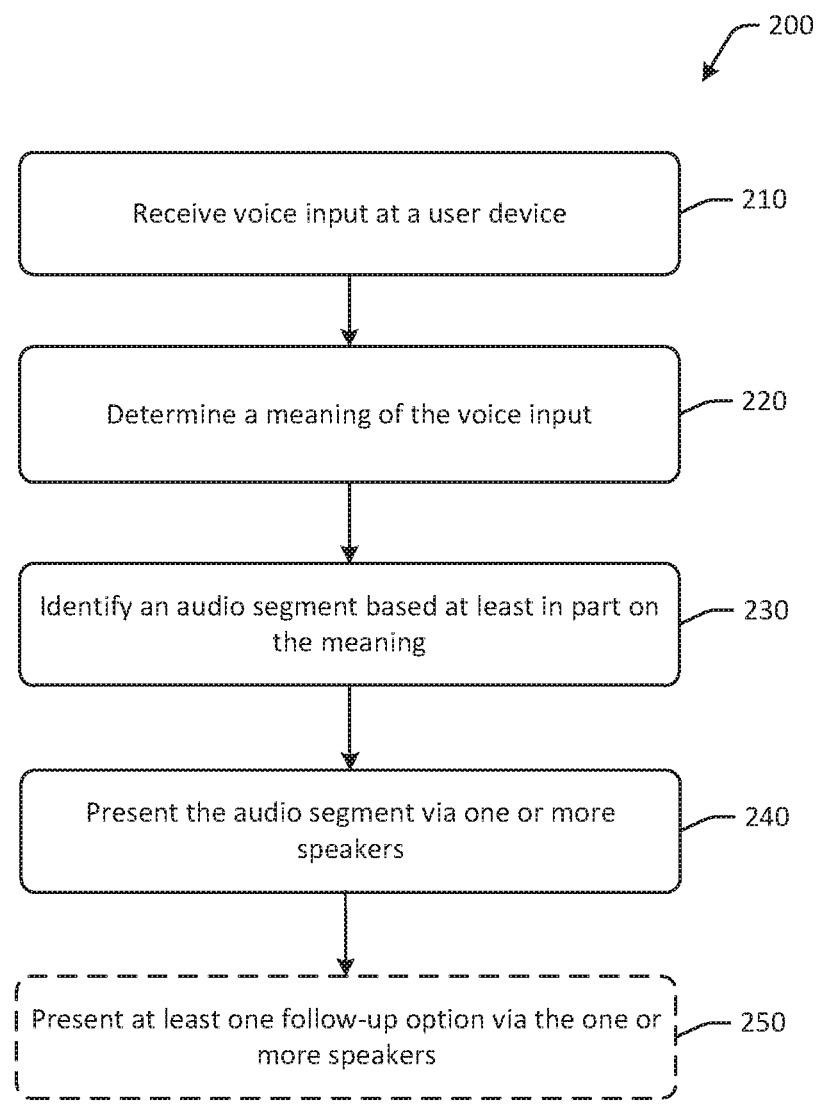
FIG. 2 is a schematic illustration of an example process flow for dynamic voice assistant interaction in accordance with one or more example embodiments of the disclosure.

FIG. 2 depicts an example process flow 200 for dynamic voice assistant interaction in accordance with one or more embodiments of the disclosure. While example embodiments of the disclosure may be described in the context of voice interaction devices, it should be appreciated that the disclosure is more broadly applicable to any user device configured to generate audio, and some or all of the blocks of the process flows in this disclosure may be performed in a distributed manner across any number of devices.

At block 210 of the process flow 200, computer-executable instructions stored on a memory of a device, such as a voice interaction device, may be executed to receive voice input at a user device. For example, a voice interaction device may include one or more processors and at least one memory communicatively coupled to the one or more processors. The voice interaction device may be able to receive and transmit or send information via wired or wireless communication. The voice interaction device may include one or more microphones or other audio input device, and may include or otherwise be coupled to one or more speakers or speaker devices in some embodiments. The voice interaction device may receive voice input as analog sound input via one or more microphones.

In some embodiments, the voice input may be analyzed to determine whether the voice input included a wakeword or a trigger word. A trigger word may be a word of a set of one or more trigger words that indicates a type of request included in the voice input. Example types of requests, as described herein, may include search requests, such as content search requests, verbal queries, such as requests for information, including weather, news, and other information, requests for suggestions, including for activities, food, and other suggestions, and the like. Trigger words may be identified by comparing one or more words of the voice input to a table including the set of one or more trigger words. Identification of trigger words may be performed locally at the device in some embodiments, while in other embodiments, the device may receive an indication that the voice input included a trigger word, such as from one or more remote servers. In some embodiments, positioning or arrangement of words in the voice input may be used in determining whether the voice input includes a trigger word. For example, in some embodiments, if the first character or word of the voice input is not a trigger word, the voice input may be considered or determined to not include a trigger word.

At block 220 of the process flow 200, computer-executable instructions stored on a memory of a device may be executed to determine a meaning of the voice input. For example, a voice interaction device may determine a meaning of the voice input locally, or in some embodiments, may convert the voice input to audio data and send the audio data to one or more remote servers for voice processing. To determine a meaning of the voice input, the voice input may be converted to voice data. The voice data may be processed to determine a meaning of the voice data. In some embodiments, the voice data may be parsed to identify words in the voice data. The parsed words may be processed to determine one or more keywords or categories associated with the parsed words in order to determine a meaning of the voice data. Some embodiments may use natural language processing techniques to determine a meaning of the voice data.

In other embodiments, the voice data may be converted into text. For example, A speech recognition process may transcribe the voice data into text data representing the words of the speech contained in the voice data. The text data may then be used by other components for various purposes, such as executing system commands, inputting data, etc. A spoken utterance in the voice data is input to a processor configured to perform speech recognition which then interprets the utterance based on the similarity between the utterance and pre-established language models stored in an speech recognition model knowledge base. For example, the speech recognition process may compare the input audio data with models for sounds (e.g., subword units or phonemes) and sequences of sounds to identify words that match the sequence of sounds spoken in the utterance of the audio data. The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds, and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the speech recognition process outputs the most likely text recognized in the audio data. The speech recognition process may also output multiple hypotheses in the form of a lattice or an N-best list with each hypothesis corresponding to a confidence score or other score (such as probability scores, etc.).

In some embodiments, the voice assistant device may determine whether the voice data includes a conversation request. A conversation request may indicate that the voice data includes a certain type of request and/or is to be processed in a specific manner. For example, a conversation request may be any type of user request (e.g., "can you find me a place for dinner?"), or may be a trigger word, such as "Alexa." Conversation requests may indicate that the voice data includes a verbal query and/or that the voice data is to be processed as a verbal query as opposed to, for example, a command (e.g., "play me a song"). In certain implementations, the voice assistant device may have an expression detector that analyzes an audio signal produced by a microphone of the remote control to detect one or more trigger words or requests, which generally may be a predefined word, phrase, or other sound. Such an expression detector may be implemented using keyword spotting technology, as an example. A keyword spotter may be a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

At block 230 of the process flow 200, computer-executable instructions stored on a memory of a device may be executed to identify an audio advertisement based at least in part on the meaning. The audio advertisement may be identified based at least in part on a correlation between the meaning and one or more candidate advertisements or candidate advertisers. For example, a food related request (as determined by the meaning of the voice input) may be associated with food related candidate advertisements and/ or candidate advertisers, while an entertainment related request may be associated with concert advertisements, movie theatre advertisers, and so forth.

Audio advertisements may be associated with audio advertisement identifiers and may be "text-to-speech" files converted to audio by a voice interaction device, or could be audio files prepared by third party entities (such as advertisers) and presented via the voice interaction device. Audio advertisements may be communicated to voice interaction devices via audio streams.

Audio content, such as audio advertisements, may be presented, in some embodiments, only in response to a user voice input, or after a user has initiated a conversation with a voice interaction device. In other embodiments, audio content may be presented at any time. Audio advertisements may be configured to allow users to interact with the audio ads via a set of predefined response keywords, each of which can trigger an event (e.g., email more info to the user, send content to a particular mobile app, etc.).

At block 240, computer-executable instructions stored on a memory of a device may be executed to present the audio advertisement via one or more speakers. The one or more speakers may be coupled to or otherwise associated with a voice interaction device. The audio advertisements may be injected into existing audio streams. For example, audio advertisements may be injected into the playback of audio streams generated by other services (e.g., a news briefing, during playback of tracks from a music playlist, etc.). Control of audio advertisement injection timing or positioning may be determined by the voice interaction device, one or more remote servers, or by third parties. Upon completion of ad presentation, or upon completion of a conversation or interaction with a user, control of audio output may be returned to the original audio content or controlling entity at the point of interruption. Placement of audio ads may affect pricing, in that frequently requested audio content streams, such as the morning news briefing or music playback, may be considered premium placements and may be higher priced.

In some embodiments, audio advertisements may be injected into voice interaction device responses to specific queries. For example, after processing a user request or query, the voice interaction device could append an audio ad to the results of that query. In such cases, ads could be selected based on keywords contained in the user's query. In instances where a meaning of a user request or query is not determined, one or more keywords may still be extracted from the user's request and used for ad selection. Such ad slots may be auctioned off using a keyword-bidding model.

In some embodiments, audio advertisements may be injected into voice interaction device responses to specific queries for ads. For example, a user may request one or more audio ads, such as a specific ad (e.g., "replay the ad I just heard"), or a general request for ads (e.g., "what shopping deals are available today?").

Embodiments of the disclosure may record the user's place in their original audio content stream when an audio ad starts, and return them to that point when ad interaction is complete. In some embodiments, a notification may be generated to indicate that an audio ad will be or has been presented, such as a tone at the start of the ad, having ad speech be in a distinct voice, etc. Users may therefore be alerted to sponsored content presentation.

Users may be able to interrupt presentation of audio ad playback. In some embodiments, a configurable threshold may define a minimum length of playback of an audio ad that a user must hear in order to count an impression for the ad. If a user frequently interrupts ad playback, the user may be presented with a reduced number of audio ads.

At optional block 250, computer-executable instructions stored on a memory of a device may be executed to present at least one follow-up option via the one or more speakers. For example, the voice interaction device may initiate data transfers, schedule events, initiate purchases or subscriptions, initiate phone calls, text messages, emails, etc., or perform other follow-up actions based on a user request or a user's affirmative request to a follow-up option provided by the voice interaction device. The voice interaction device may integrate with other devices, and may therefore initiate presentation of visual advertisements on a connected device (e.g., smartphone, etc.).

Figure 3:
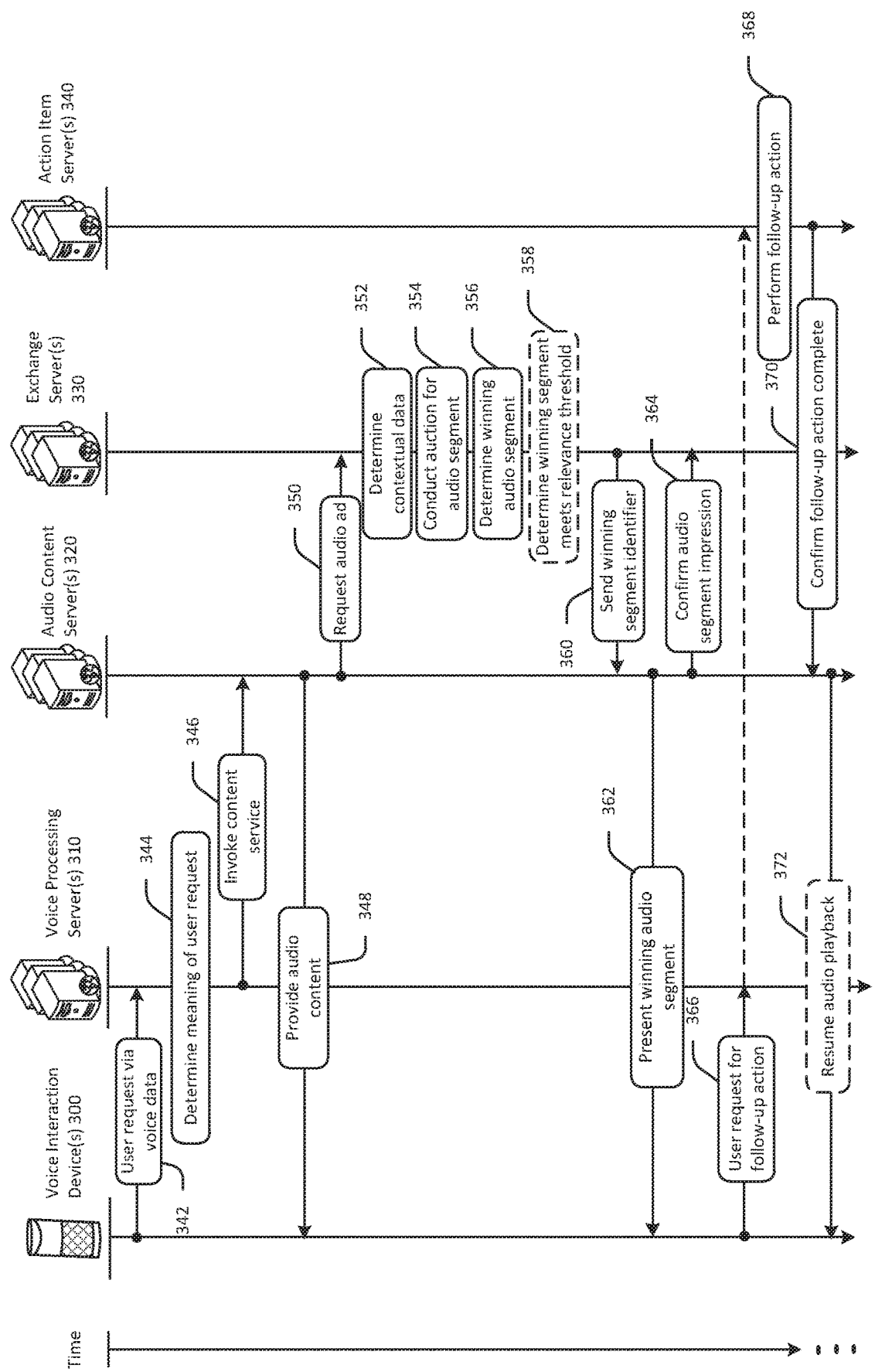
FIG. 3 is a schematic illustration of an example data flow for dynamic voice assistant interaction in accordance with one or more example embodiments of the disclosure.

FIG. 3 illustrates an example dataflow for dynamic voice assistant interaction in accordance with one or more embodiments of the disclosure. A dynamic voice assistance system may include one or more voice interaction devices 300, one or more voice processing servers 310, one or more audio content servers, one or more ad or other exchange servers, and/or one or more action item servers. Each of the system components may be in communication via one or more networks. The voice interaction device 300 may be the same as the voice interaction device 110 of FIG. 1. In some embodiments, the voice interaction device 300 may be configured to present singular audio content at any given time, in that when music is playing, a single music track is generally playing, as opposed to two songs playing at once.

At operation 342, the voice interaction device 300 may send a user request made via voice data to the voice processing server(s) 310. The user request may be sent as voice data that is generated based at least in part on analog sound input. At operation 344, the voice processing server(s) 310 may determine a meaning of the user request. At operation 346, the voice processing server(s) 310 may include content service from the audio content server(s) 320. In response, the audio content server(s) 320 may provide audio content to the voice interaction device at operation 348.

At operation 350, the audio content server(s) 320 may request an audio ad or an audio segment from the exchange server(s) 330. The exchange server(s) 330 may receive the request, and at operation 352, the exchange server(s) 330 may determine contextual data. At operation 354, the exchange server(s) 330 may conduct an auction for an audio segment. The auction may include sending a bid request to one or more ad server(s), where the bid request includes a request for bids for an audio segment to be presented to a user. The exchange server(s) 330 may receive a number of bids from the ad servers, where the bids may include a bid amount, an advertisement category identifier, and/or optionally include text of a candidate audio segment. At operation 356, the exchange server(s) 330 may determine a winning audio ad. For example, the winning audio ad may be associated with the highest bid. At operation 358, the exchange server(s) 330 may optionally determine that the winning audio segment meets a relevance threshold. In some embodiments, relevance may be determined based at least in part on an advertisement category identifier, a numeric score, or another relevance metric. In some embodiments, the relevance threshold may include a determination as to whether an advertiser associated with an audio segment is blacklisted. A blacklisted advertiser may be an advertiser to which the user has indicated they do not want ads from, a competitor to a previous advertiser, or blacklisted advertisers for another reason.

At operation 360, the exchange server(s) 330 may send a winning ad identifier to the audio content server(s) 320. At operation 362, the winning audio ad may be presented at the voice interaction device 300 as an audio stream. The ad may be presented by converting text of the candidate audio segment to audio data, or by playing a prepared audio file, for example. At operation 364, the audio content server(s) 320 may confirm the audio ad impression by sending a notification to the exchange server(s) 330. At operation 366, the voice interaction device 300 may send a user request for a follow-up action to the action item server(s) 340. At operation 368 the action item server(s) 340 may perform or initiate the follow-up action. At operation 370, the action item server(s) 340 may confirm the follow-up action is complete by sending a notification to the audio content server(s) 320. The voice interaction device 300 may resume audio playback at optional operation 372 by receiving an audio stream from the audio content server(s) 320, for example, if initial audio playback was interrupted by the user request.

Figure 4:
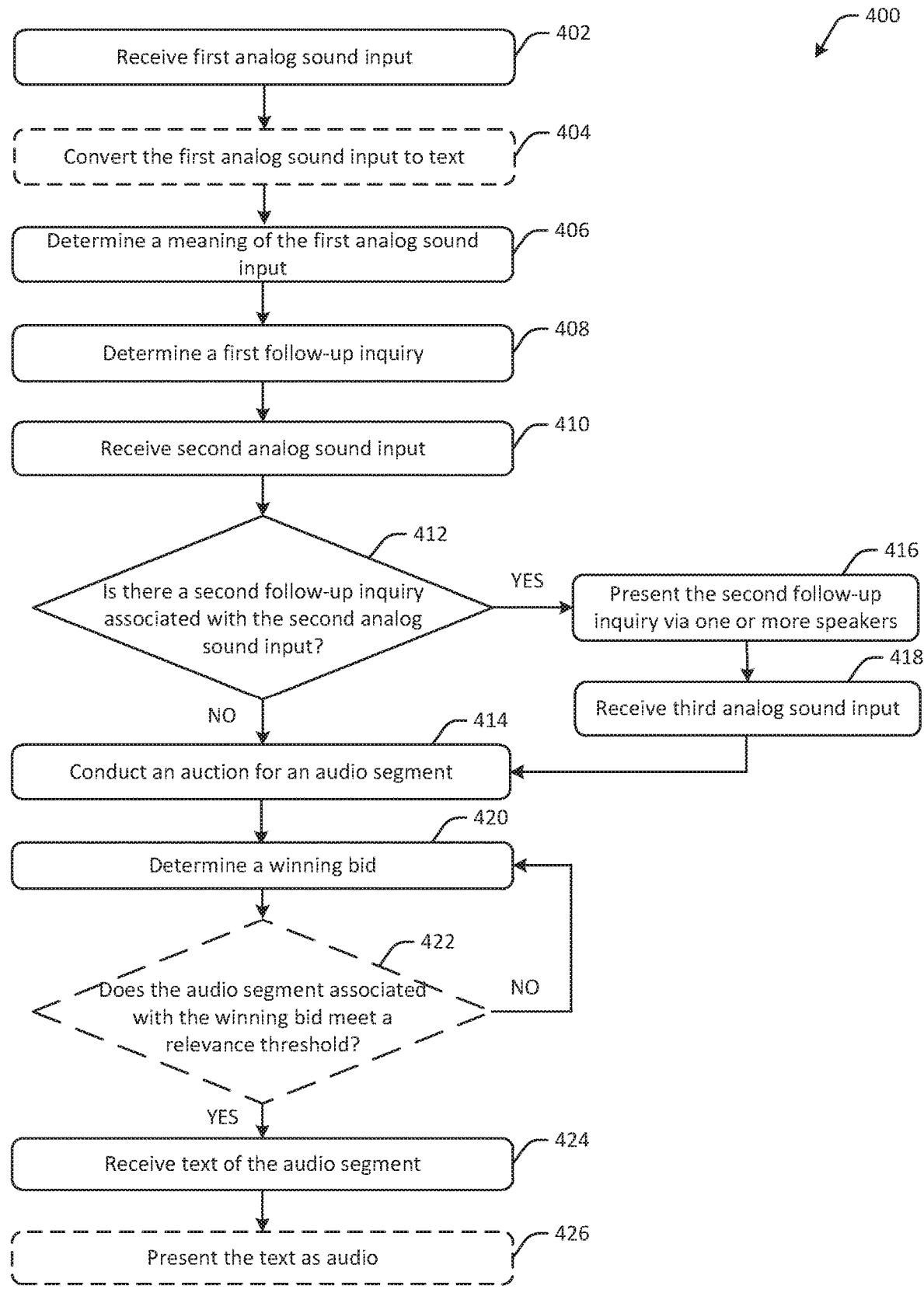
FIG. 4 is a schematic illustration of an example process flow for dynamic voice assistant interaction in accordance with one or more example embodiments of the disclosure.

FIG. 4 depicts an example process flow 400 for dynamic voice assistant interaction in accordance with one or more embodiments of the disclosure. Block 402 of the process flow includes receiving first analog sound input. For example, analog sound input or voice data may be received via one or more microphones configured to generate signals based at least in part on incident or ambient sounds. In certain example embodiments, the one or more microphones may be configured to receive sound input in the form of analog sound and may generate electrical signals indicative of the analog sound. Processing circuitry may convert the analog sound to digital voice data using an analog-to-digital converter (ADC). Digital voice data may be generated from the analog sound input using the ADC.

Optional block 404 of the process flow includes converting the first analog sound input to text data. The text data may include a textual representation of a user utterance, which may be the analog sound input and/or voice data. Block 406 includes determining a meaning of the first analog sound input. For example, embodiments of the disclosure may determine a keyword associated with the text data, and may use the keyword to identify or determine a user request based at least in part on the keyword. At block 408, a first follow-up inquiry is determined. The follow-up inquiry may be determined, in one example, by identifying a follow-up inquiry associated with a particular keyword, or by other natural language processing techniques. The follow-up inquiry may be structured so as to narrow down a field or category of potential segments or advertisers. For example, if the meaning of the first analog sound input indicates that a user is looking for plans for the evening, the first follow-up inquiry may be to ask the user if the user is interested in a particular activity, or one or a selected number of activities, such as "would you like to go to a concert?" or "are you interested in a movie, a museum, or a concert?" The first follow-up inquiry may be presented as an audible response. In some embodiments, follow-up inquiries may be predetermined and may be identified based at least in part on keywords associated with a meaning of an utterance spoken by a user.

At block 410, second analog sound input is received. For example, the second analog sound input may be a response to the first follow-up inquiry. The second analog sound input may be processed to determine a meaning of the second analog sound input. The meaning may indicate an affirmative or negative response to the first follow-up inquiry, a selection of one of a number of presented options during the first follow-up inquiry, or another meaning.

At determination block 412 of the process flow 400, a determination is made as to whether there is a second follow-up inquiry associated with the second analog sound input. For example, if the second analog sound input indicates an affirmative response to the first follow-up inquiry, then there may not be a second follow-up inquiry, whereas if the response is negative, there may be a second follow-up inquiry. For example, if the first follow-up inquiry is "would you like to go to a concert?" and the second analog sound input has a meaning of "yes," then there may not be a second follow-up inquiry because the user intent can be determined to be interest in a concert. If the user response was "no," however, then a second follow-up inquiry may be "are you interested in a movie?"

If it is determined that there is a second follow-up inquiry, the process flow 400 may proceed to block 416, at which the second follow-up inquiry is presented. At block 418, third analog sound input is received. The third analog sound input may be a response to the second follow-up inquiry. The third voice data or third analog sound input may include an answer to the second follow-up inquiry. A user interest level may be determined using the answer. For example, if the answer is in the affirmative, the user interest level may be increased, or if the answer is in the negative, the user interest level may be decreased. In some instances, there may not be a predetermined follow-up inquiry associated with the first meaning. For example, the user may make a request or may otherwise speak an utterance that is not associated with any candidate advertisements or advertisers, or for which no further inquiries are available. For example, the user may utter "what fine dining establishments are within a mile?" In such instances, a follow-up inquiry may not help to narrow the user intent, and so an auction may be conducted based on the meaning of the first analog sound input in a conversation. The winning bid may provide text or audio for responding to the user. For example, the audio response may be "Miller's has a four and a half star rating and is open now" if Miller's wins the auction. Similarly, if there is no keyword associated with a meaning of a user utterance, an auction may be performed based at least in part on the contextual and user-specific data.

If it is determined that there is no second follow-up inquiry, or after the third analog sound is received, the process flow 400 continues to block 414, at which an auction for an audio advertisement is conducted. The advertisement auction may be for an audio advertisement to present in response to the second or third analog sound input. The advertisement auction may be based at least in part on the first meaning. The auction process may include generating a bid request with contextual information, such as user responses, user identifiers, geolocation information, time of day, purchase history, and the like. Contextual data may also include identifiers for current content that is being presented or an associated content identifier, a content playback position identifier, voice data indicative of the user's utterance, an intended response, and the like.

At block 420 of the process flow 400, a winning bid is determined. The winning bid may be associated with a particular advertisement or with a particular advertiser. At optional determination block 422, a determination is made as to whether the winning audio advertisement or advertiser associated with the winning bid meets a relevance threshold. The relevance threshold may indicate whether the winning advertisement or advertiser matches a category of the user utterance, or another alphanumeric threshold. If it is determined that the winning advertisement or advertiser does not meet the relevance threshold, the process flow 400 returns to block 420, at which a subsequent winning bid is determined. If it is determined that the winning advertisement or advertiser meets the relevance threshold, the process flow 400 continues to block 424, at which text of the audio advertisement is received. At optional block 426, the text is presented as audio. For example, the text may be presented as audio via one or more speakers coupled to or in communication with a device. In some embodiments, third party audio files may be presented instead of text that is converted to audio.

In some embodiments, more than one audio advertisement auction may be conducted. For example, during a conversation, a first auction may be conducted before a user interest level in a particular category or item is determined. Embodiments of the disclosure may generate a price floor schedule for ads to be presented to the user not only for an immediate ad slot, but for subsequent ad slots during the conversation. For example, if the user is hungry, a first ad slot may have a price floor of $1, and all food related entities may bid. The price floor may be included in a bid request. The bid request may also include a price schedule with price floors or other pricing information for subsequent ads to be presented further into the conversation. For example, if McDonald's wins the first auction, and a follow-up inquiry determines that the user is indeed interested in fast food, McDonald's may have to pay $1.50 or another predetermined amount to present a McDonald's ad. In other embodiments, a winner of a first auction may have a right of first refusal to present subsequent ads during a conversation. For example, if the price floor for a third ad is $4, McDonald's may be offered the ad slot before an auction is conducted. If McDonald's does not present an ad, another fast food entity may bid on the ad slot.

Audio ads may be placed and/or presented within existing audio streams (e.g., two minutes into a morning briefing or after 30 minutes of music playback), in response to user requests for which no information is otherwise available, etc. Embodiments of the disclosure may also present visual ads at other devices based at least in part on user interactions and/or conversations.

One or more operations of the method, process flows, or use cases of FIGS. 2-4 may have been described above as being performed by a user device, or more specifically, by one or more program module(s), applications, or the like executing on a device. It should be appreciated, however, that any of the operations of methods, process flows, or use cases of FIGS. 2-4 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 2-4 may be described in the context of the illustrative devices, it should be appreciated that such operations may be implemented in connection with numerous other device configurations.

The operations described and depicted in the illustrative methods, process flows, and use cases of FIGS. 2-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 5:
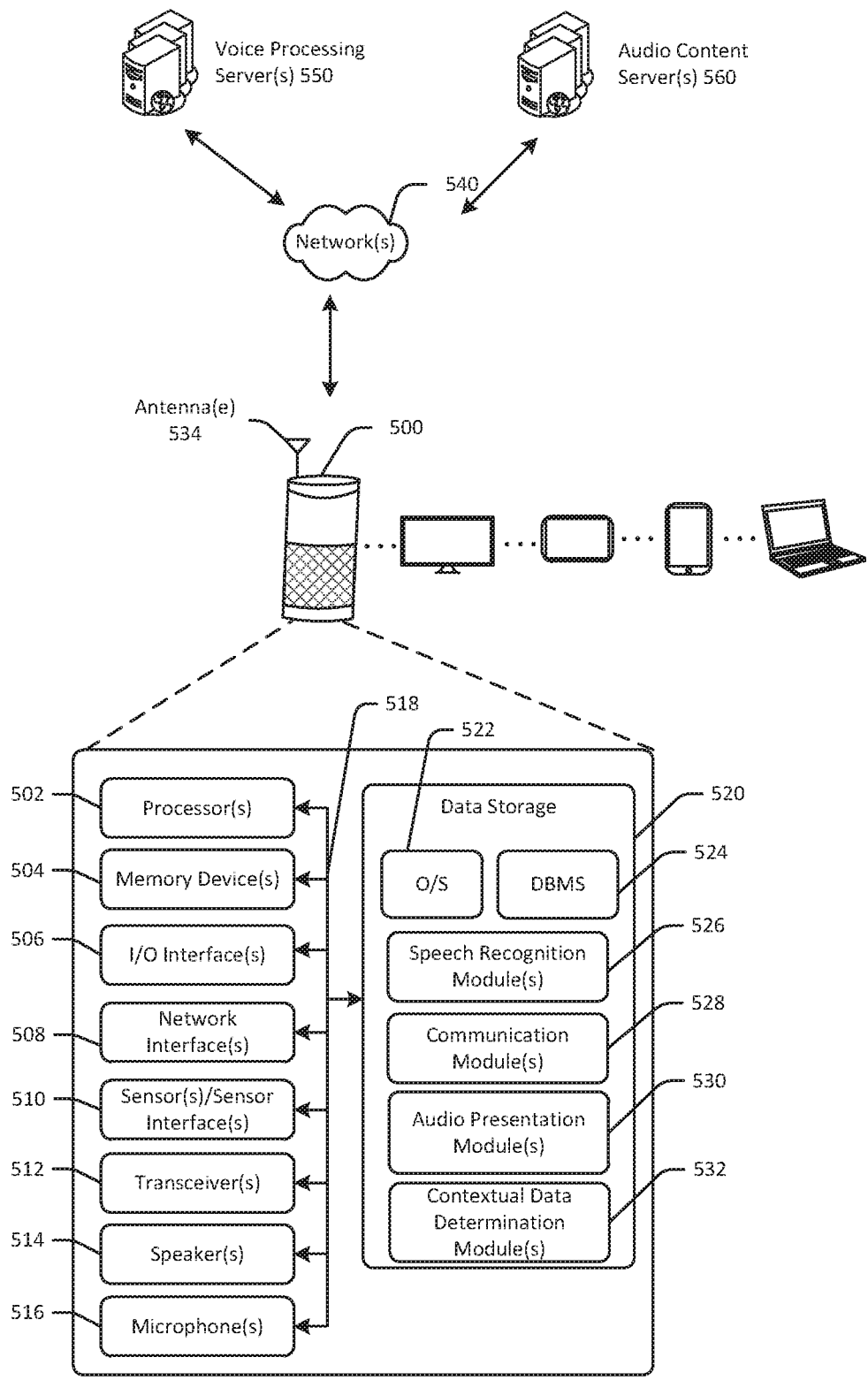
FIG. 5 is a schematic block diagram of an illustrative voice assistant device in accordance with one or more example embodiments of the disclosure.

FIG. 5 is a schematic block diagram of an illustrative voice interaction device 500 in accordance with one or more example embodiments of the disclosure. The voice interaction device 500 may include any suitable computing device capable of receiving and/or generating audio including, but not limited to, a mobile device such as a smartphone, tablet, e-reader, wearable device, or the like; a desktop computer; a laptop computer; a content streaming device; a set-top box; or the like. The voice interaction device 500 may correspond to an illustrative device configuration for the voice interaction devices of FIGS. 2-4.

The voice interaction device 500 may be configured to communicate via one or more networks 540 with one or more servers, user devices, or the like. For example, in the illustration of FIG. 5, the voice interaction device 500 may be configured to communicate with a voice processing server(s) 550 and an audio content server(s) 560. The voice processing server(s) 550 may be configured to perform a first type of voice processing, such as conversational voice processing, while the audio content server(s) 560 may be configured to perform audio content streaming functionality. In some embodiments, a single remote server or single group of remote servers may be configured to perform more than one type of voice processing and/or audio content streaming functionality.

The voice interaction device 500 may be configured to communicate via one or more networks 540. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the voice interaction device 500 may include one or more processors (processor(s)) 502, one or more memory devices 504 (generically referred to herein as memory 504), one or more input/output ("I/O") interface(s) 506, one or more network interface(s) 508, one or more sensors or sensor interface(s) 510, one or more transceivers 512, one or more speakers 514, one or more microphones 516, and data storage 520. The voice interaction device 500 may further include one or more buses 518 that functionally couple various components of the voice interaction device 500. The voice interaction device 500 may further include one or more antenna(e) 534 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, a memory bus, an address bus, or a message bus, and may permit exchange of information (e.g., data (including computer-executable code), signaling, etc.) between various components of the voice interaction device 500. The bus(es) 518 may include, without limitation, a memory bus or a memory controller, a peripheral bus, an accelerated graphics port, and so forth. The bus(es) 518 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the voice interaction device 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 520 may include removable storage and/or non-removable storage including, but not limited to, magnetic storage, optical disk storage, and/or tape storage. The data storage 520 may provide non-volatile storage of computer-executable instructions and other data. The memory 504 and the data storage 520, removable and/or non-removable, are examples of computer-readable storage media (CRSM) as that term is used herein.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504, and may ultimately be copied to data storage 520 for non-volatile storage.

More specifically, the data storage 520 may store one or more operating systems (O/S) 522; one or more database management systems (DBMS) 524; and one or more program module(s), applications, engines, computer-executable code, scripts, or the like such as, for example, one or more speech recognition module(s) 526, one or more communication module(s) 528, one or more audio presentation module(s) 530, and/or one or more contextual data determination module(s) 532. Some or all of these module(s) may be sub-module(s). Any of the components depicted as being stored in data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 520 may support functionality described in reference to correspondingly named components earlier in this disclosure.

The data storage 520 may further store various types of data utilized by components of the voice interaction device 500. Any data stored in the data storage 520 may be loaded into the memory 504 for use by the processor(s) 502 in executing computer-executable code. In addition, any data depicted as being stored in the data storage 520 may potentially be stored in one or more datastore(s) and may be accessed via the DBMS 524 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, the datastore(s) may include, for example, keyword information, predetermined follow-up inquiries, and other information.

The processor(s) 502 may be configured to access the memory 504 and execute computer-executable instructions loaded therein. For example, the processor(s) 502 may be configured to execute computer-executable instructions of the various program module(s), applications, engines, or the like of the voice interaction device 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the speech recognition module(s) 526 may include computer-executable instructions, code, or the like that responsive to execution by one or more of the processor(s) 502 may perform functions including, but not limited to, monitoring for voice data or analog sound input, processing voice data, and/or sending or receiving voice data from a wirelessly connected device. The speech recognition module(s) 526 may be configured to determine a meaning of detected or received voice data, as well as identify keywords.

The communication module(s) 528 may include computer-executable instructions, code, or the like that responsive to execution by one or more of the processor(s) 502 may perform functions including, but not limited to, communicating with one or more devices, for example, via wired or wireless communication.

The audio presentation module(s) 530 may include computer-executable instructions, code, or the like that responsive to execution by one or more of the processor(s) 502 may perform functions including, but not limited to, generating audio content, presenting audio via the speakers 514, and the like.

The contextual data determination module(s) 532 may include computer-executable instructions, code, or the like that responsive to execution by one or more of the processor(s) 502 may perform functions including, but not limited to, collecting or determining contextual information for bid requests.

Referring now to other illustrative components depicted as being stored in the data storage 520, the O/S 522 may be loaded from the data storage 520 into the memory 504 and may provide an interface between other application software executing on the voice interaction device 500 and hardware resources of the voice interaction device 500. More specifically, the O/S 522 may include a set of computer-executable instructions for managing hardware resources of the voice interaction device 500 and for providing common services to other application programs (e.g., managing memory allocation among various application programs). In certain example embodiments, the O/S 522 may control execution of the other program module(s) to dynamically enhance characters for content rendering. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the voice interaction device 500 is a mobile device, the DBMS 524 may be any suitable light-weight DBMS optimized for performance on a mobile device.

Referring now to other illustrative components depicted as being stored in the data storage 520, the O/S 522 may be loaded from the data storage 520 into the memory 504 and may provide an interface between other application software executing on the voice interaction device 500 and hardware resources of the voice interaction device 500. More specifically, the O/S 522 may include a set of computer-executable instructions for managing hardware resources of the voice interaction device 500 and for providing common services to other application programs (e.g., managing memory allocation among various application programs). In certain example embodiments, the O/S 522 may control execution of one or more of the program module(s) depicted as being stored in the data storage 520. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository. In certain example embodiments, the DBMS 524 may be any suitable light-weight DBMS optimized for performance on a mobile device.

Referring now to other illustrative components of the voice interaction device 500, the input/output (I/O) interface(s) 506 may facilitate the receipt of input information by the voice interaction device 500 from one or more I/O devices as well as the output of information from the voice interaction device 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the voice interaction device 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 534 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The voice interaction device 500 may further include one or more network interface(s) 508 via which the voice interaction device 500 may communicate with any of a variety of other systems, platforms, networks, devices, and so forth. The network interface(s) 508 may enable communication, for example, with the wireless router 108, the host server 112, and/or one or more web servers (e.g., the web server 406) via one or more of the network(s) 110.

The antenna(e) 534 may include any suitable type of antenna depending, for example, on the communications protocols used to transmit or receive signals via the antenna (e) 534. Non-limiting examples of suitable antennas may include directional antennas, non-directional antennas, dipole antennas, folded dipole antennas, patch antennas, multiple-input multiple-output (MIMO) antennas, or the like. The antenna(e) 534 may be communicatively coupled to one or more transceivers 512 or radio components to which or from which signals may be transmitted or received.

As previously described, the antenna(e) 534 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 534 may additionally, or alternatively, include a Wi-Fi antenna configured to transmit or receive signals in accordance with established standards and protocols, such as the IEEE 502.11 family of standards, including via 2.4 GHz channels (e.g. 502.11b, 502.11g, 502.11n), 5 GHz channels (e.g. 502.11n, 502.11ac), or 60 GHZ channels (e.g. 502.11ad). In alternative example embodiments, the antenna(e) 534 may be configured to transmit or receive radio frequency signals within any suitable frequency range forming part of the unlicensed portion of the radio spectrum.

The antenna(e) 534 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 534—transmitting or receiving radio frequency (RF) signals in the bandwidth and/or channels corresponding to the communications protocols utilized by the voice interaction device 500 to communicate with other devices. The transceiver(s) 512 may include hardware, software, and/or firmware for modulating, transmitting, or receiving—potentially in cooperation with any of antenna(e) 534—communications signals according to any of the communications protocols discussed above including, but not limited to, one or more Wi-Fi and/or Wi-Fi direct protocols, as standardized by the IEEE 502.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the voice interaction device 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 514 may be any device configured to generate audible sound. The microphone(s) 516 may be any device configured to receive analog sound input or voice data.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the voice interaction device 500, and/or hosted on other computing device(s) accessible via one or more networks, may be provided to support functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the voice interaction device 500 may include alternate and/or additional hardware, software, or firmware components beyond those described or depicted without departing from the scope of the disclosure. More particularly, it should be appreciated that software, firmware, or hardware components depicted as forming part of the voice interaction device 500 are merely illustrative and that some components may not be present or additional components may be provided in various embodiments. While various illustrative program module(s) have been depicted and described as software module(s) stored in data storage 520, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-4 may be performed by a device having the illustrative configuration depicted in FIG. 5, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   receiving, by one or more computer processors coupled to at least one memory, first voice data comprising a user utterance;
   converting the first voice data to first text data, wherein the first text data comprises a textual representation of the user utterance;
   determining a first keyword in the first text data;
   identifying a user request using the first keyword;
   determining a first follow-up inquiry associated with the user request;
   presenting a first audible response to the user request, wherein the first audible response comprises the first follow-up inquiry;
   receiving second voice data in response to the first audible response;
   converting the second voice data to second text data;
   determining that the second text data does not include a keyword;
   sending a first bid request to an ad server, wherein the first bid request comprises a request for bids for audio content to be presented in response to the second voice data;
   receiving a bid from the ad server, wherein the bid comprises a bid amount, text of candidate audio content, and a content category identifier;
   determining that the candidate audio content meets a relevance threshold using the content category identifier;
   determining that the bid is a winning bid;
   converting the text of the candidate audio content to audio data;
   presenting a second audible response comprising the audio data, wherein the audio data represents a second follow-up inquiry;
   receiving third voice data comprising an answer to the second follow-up inquiry;
   determining a user interest level using the answer, wherein the user interest level increases responsive to an affirmative answer and decreases responsive to a negative answer; and
   sending a second bid request based at least in part on the user interest level; and
   presenting a third audible response indicating that an audio advertisement is forthcoming.

2. The method of claim 1, further comprising:
   presenting a fourth audible response, wherein the third audible response comprises an offer to purchase an item; and
   initiating purchase of the item.

3. The method of claim 1, wherein the first voice data is received during a user interaction, and wherein the bid request comprises a predetermined pricing schedule for subsequent audio content to be presented during the user interaction.

4. A method comprising:
   receiving, by one or more computer processors coupled to at least one memory, first voice data;
   determining a first meaning of the first voice data;

determining a set of candidate advertisers based at least in part on the first meaning, the set of candidate advertisers comprising a first advertiser;
determining a predetermined follow-up inquiry to the first voice data based at least in part on the first meaning and a category associated with the first advertiser; causing audible presentation of a first audio response to the first voice data, wherein the first audio response comprises the predetermined follow-up inquiry;
conducting an auction for an audio segment for an available audio segment slot, wherein the set of candidate advertisers is eligible to participate in the auction;
determining that the first advertiser is a winner of the auction;
determining a winning segment from the first advertiser, the winning segment comprising text for presentation as audio;
causing audible presentation of an indication that an audio advertisement is forthcoming; and
causing audible presentation of the text.

5. The method of claim 4, further comprising presenting the first audio response via one or more speaker devices.

6. The method of claim 4, further comprising:
determining a keyword associated with the first meaning;
wherein determining the predetermined follow-up inquiry to the first voice data based at least in part on the first meaning and the category associated with the first advertiser comprises determining the predetermined follow-up inquiry to the first voice data based at least in part on the keyword and the category associated with the first advertiser.

7. The method of claim 4, further comprising determining that there is no secondary predetermined follow-up inquiry associated with the first meaning.

8. The method of claim 4, wherein the audio segment is a first audio segment, the method further comprising:
receiving second voice data;
sending a bid request to the first advertiser for a second audio segment in response to the second voice data, wherein the bid request comprises a predetermined price floor; and
sending a bid request to the set of candidate advertisers after sending the bid request to the first advertiser.

9. The method of claim 8, wherein the segment auction is a first segment auction, the method further comprising:
receiving a bid amount from the first advertiser;
determining that the bid amount does not meet the predetermined price floor; and
conducting a second segment auction for the second audio segment.

10. The method of claim 4, further comprising:
receiving a bid from the first advertiser, the bid comprising a bid amount, and text of a candidate audio segment; and
determining that the candidate audio segment is eligible.

11. The method of claim 4, further comprising:
determining that the first advertiser is associated with the first meaning;
receiving a bid from a second advertiser, the bid comprising a bid amount, and text of a candidate audio segment;
determining that the second advertiser is a blacklisted advertiser; and
canceling the bid.

12. The method of claim 4, wherein determining the first meaning of the first voice data comprises:

converting the first voice data to first text data, wherein the first text data comprises a textual representation of a user utterance;
determining a first keyword associated with the first text data; and
identifying a user request using the first keyword.

13. A device comprising:
a speaker device;
at least one memory that stores computer-executable instructions; and
at least one processor configured to access the at least one memory and execute the computer-executable instructions to:
receive first voice data;
determine a first meaning of the first voice data;
determine a set of candidate advertisers based at least in part on the first meaning, the set of candidate advertisers comprising a first advertiser;
determine a predetermined follow-up inquiry to the first voice data based at least in part on the first meaning and a category associated with the first advertiser;
cause audible presentation of a first audio response to the first voice data, wherein the first audio response comprises the predetermined follow-up inquiry; conduct an auction for an audio segment for an available audio segment slot, wherein the set of candidate advertisers is eligible to participate in the auction;
determine a winning segment from an advertiser, the winning segment comprising text for presentation as audio;
determine that the first advertiser is a winner of the auction;
cause audible presentation of an indication that an audio advertisement is forthcoming; and
cause audible presentation of the text.

14. The device of claim 13, wherein the at least one processor is further configured to access the at least one memory and execute the computer-executable instructions to present the first audio response via the speaker device.

15. The device of claim 13, wherein the at least one processor is further configured to access the at least one memory and execute the computer-executable instructions to:
determine a keyword associated with the first meaning;
wherein the at least one processor is configured to determine the predetermined follow-up inquiry to the first voice data based at least in part on the first meaning and the category associated with the first advertiser by determining the predetermined follow-up inquiry to the first voice data based at least in part on the keyword and the category associated with the first advertiser.

16. The device of claim 13, wherein the audio segment is a first audio segment, and wherein the at least one processor is further configured to access the at least one memory and execute the computer-executable instructions to:
receive second voice data; and
send a bid request to the first advertiser for a second audio segment in response to the second voice data, wherein the bid request comprises a predetermined price floor.

17. The method of claim 4, further comprising determining that the category associated with the first advertiser corresponds to a category associated with the first meaning.

18. The device of claim 13, wherein the at least one processor is further configured to access the at least one memory and execute the computer-executable instructions to:

determine that the category associated with the first advertiser corresponds to a category associated with the first meaning.

* * * * *